(12) United States Patent
Tsay et al.

(10) Patent No.: US 11,126,282 B2
(45) Date of Patent: Sep. 21, 2021

(54) SYSTEM AND METHOD FOR TOUCHPAD DISPLAY INTERACTION WITH INTERACTIVE AND NON-INTERACTIVE REGIONS

(71) Applicant: Honda Motor Co., Ltd., Tokyo (JP)

(72) Inventors: Michael Tsay, Irvine, CA (US); Richard Magness, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/370,355

(22) Filed: Mar. 29, 2019

(65) Prior Publication Data
US 2020/0310565 A1 Oct. 1, 2020

(51) Int. Cl.
*G06F 3/0354* (2013.01)
*G06F 3/0488* (2013.01)
(Continued)

(52) U.S. Cl.
CPC ........ *G06F 3/03547* (2013.01); *G06F 3/0412* (2013.01); *G06F 3/0482* (2013.01);
(Continued)

(58) Field of Classification Search
CPC .... G06F 3/03547; G06F 3/041; G06F 3/0412; G06F 3/0416; G06F 3/048; G06F 3/0482;
(Continued)

(56) References Cited

U.S. PATENT DOCUMENTS 6,559,833 B2  5/2003  Rowe
7,768,503 B2  8/2010  Chiu et al.
(Continued)

FOREIGN PATENT DOCUMENTS

CN       1838053 A    9/2006
CN     102830819 A   12/2012
(Continued)

OTHER PUBLICATIONS

Mullenbach et al. "Reducing Driver Distraction with Touchpad physics", semanticsscholar.org , 2013, pp. 1-60.
(Continued)

*Primary Examiner* — Keith L Crawley
(74) *Attorney, Agent, or Firm* — Armstrong Teasdale LLP

(57) ABSTRACT

A vehicle infotainment system is provided. The vehicle infotainment system includes a display screen, a touchpad remote from the display screen, and a controller communicatively coupled to the display screen and to the touchpad. The controller is configured to virtually divide the touchpad into a main menu configuration. The controller is also configured to display a main menu of indicators corresponding to inactive applications, wherein the main menu occupies the entire display screen. The controller is also configured to receive a user input indicating selection of a first indicator. The controller is further configured to display selectable items associated with the first application in an interactive region of the display screen, and at least a second indicator in a non-interactive region of the display screen, and associate the touchpad with only the interactive region of the display screen.

20 Claims, 6 Drawing Sheets

(51) Int. Cl.
*G06F 3/0482* (2013.01)
*G06F 3/041* (2006.01)

(52) U.S. Cl.
CPC .... *G06F 3/04886* (2013.01); *B60K 2370/113* (2019.05); *B60K 2370/122* (2019.05); *B60K 2370/143* (2019.05); *B60K 2370/164* (2019.05)

(58) Field of Classification Search
CPC .............. G06F 3/0484; G06F 3/04842; G06F 3/04886; G06F 2203/04803; B60K 2370/10; B60K 2370/11; B60K 2370/113; B60K 2370/115; B60K 2370/119; B60K 2370/12; B60K 2370/122; B60K 2370/143; B60K 2370/1434; B60K 2370/1438; B60K 2370/164; G09G 2380/10
See application file for complete search history.

(56) References Cited

U.S. PATENT DOCUMENTS

| | | | |
|---|---|---|---|
| 9,727,231 | B2 | 8/2017 | Miller et al. |
| 9,878,246 | B2 | 1/2018 | Oh et al. |
| 9,886,108 | B2 | 2/2018 | Wolff et al. |
| 2002/0093539 | A1* | 7/2002 | Os .................. G06F 3/0482 715/810 |
| 2005/0267676 | A1* | 12/2005 | Nezu .................. G06F 3/0488 701/532 |
| 2010/0109999 | A1 | 5/2010 | Oui |
| 2010/0328236 | A1* | 12/2010 | Ma .................. G06F 3/04886 345/173 |
| 2011/0134148 | A1* | 6/2011 | Cridland ............. G06F 3/03547 345/676 |
| 2011/0205169 | A1* | 8/2011 | Yasutake ............. G06F 3/03547 345/173 |
| 2011/0291997 | A1 | 12/2011 | Fei |
| 2013/0147729 | A1 | 6/2013 | Lim |
| 2015/0286393 | A1* | 10/2015 | Wild .................. B60K 37/06 715/771 |
| 2015/0378598 | A1 | 12/2015 | Takeshi et al. |
| 2016/0011712 | A1* | 1/2016 | Yamamoto ............. B60K 35/00 345/173 |
| 2016/0077652 | A1* | 3/2016 | Yang .................. G06F 3/04886 345/174 |
| 2017/0262158 | A1* | 9/2017 | Webb .................. G06F 3/04842 |
| 2017/0371515 | A1* | 12/2017 | Feit .................. G06F 3/038 |
| 2018/0136902 | A1 | 5/2018 | Feit et al. |

FOREIGN PATENT DOCUMENTS

| | | |
|---|---|---|
| CN | 204216954 U | 3/2015 |
| CN | 107348685 A | 11/2017 |
| DE | 102004061419 A1 | 7/2006 |
| DE | 102004061420 A1 | 7/2006 |
| JP | 2000187554 A | 7/2000 |
| JP | 2010061224 A | 3/2010 |
| WO | 2006066742 A1 | 6/2006 |
| WO | 2006066715 A3 | 12/2006 |
| WO | 2014029043 A1 | 2/2014 |

OTHER PUBLICATIONS

Norberg et al. "Touchpad as interaction input control for use of In-Vehicle infotainment system", www.trid.trb.org, 2009, pp. 30-31 and 45-66.
Schweinsberg, "Acura Touchpads Aims to Cut Confusion, Distraction", Feb. 2018, http://www.wardsauto.com/interiors/acura-touchpad-aims-cut-confusion-distraction.
Hassel, "Touch screens in cars: Investigating touch gestures and audio feedback in the context of in-vehicle infotainment", muep.mau.se, 2016, pp. 1-48.
Kim et al. "Multimodal Interface Based on Novel Hmi UI/UX for In-Vehicle Infotainment System", https://doi.org/10.4218/etrij.15.0114.0076, Aug. 2015, vol. 37, Issue 4, pp. 793-803.
Adams, "Acura Intuitive True Touchpad Interface Infotainment Review: Major Points for Forward Progress", Apr. 23, 2018, http://www.thedrive.com/tech/20341/acura-intuitive-true-touchpad-interface-infotainment-review-major-points-for-forward-progress.
Dearing, "GLC & C class Command Navigation", Jul. 2016, https://www.youtube.com/watch?v=EC8Jz3HxhZk.
Villasenor, "Mercedes_Benz TouchPad howto and review", https://www.youtube.com/watch?v=pY2zKHm75Qo.
Mercedes-Benz USA How To: Navigation Map (Touchpad)—Mercedes-Benz Owner Support, Dec. 2014, https://www.youtube.com/watch?v=EbyYDtmzeq8.

* cited by examiner

SYSTEM AND METHOD FOR TOUCHPAD DISPLAY INTERACTION WITH INTERACTIVE AND NON-INTERACTIVE REGIONS

BACKGROUND

The field of the disclosure relates generally to the interaction between a touchpad and a user interface and, more particularly, to systems for use in controlling a user interface using a touchpad.

Generally, known vehicle infotainment systems provide information and entertainment options to occupants of a vehicle. Known infotainment systems may accept user input to control various aspects of the occupant's comfort, such as the vehicle interior climate and/or entertainment. Many of these controls are provided while the vehicle is in motion. However, while a vehicle's driver is accessing these controls, the user's attention is diverted from the road while actively driving. As such, a need exists to provide infotainment controls in a user-accessible manner that enables a user to quickly access desired controls while driving. Moving the controls to a more user-friendly location would facilitate reducing an amount of time that the user's attention is deviated from actively driving.

BRIEF DESCRIPTION

In one aspect, a vehicle infotainment system is provided. The vehicle infotainment system includes a display screen, a touchpad remote from the display screen, and a controller communicatively coupled to the display screen and to the touchpad. The controller is configured to virtually divide the touchpad into a main menu configuration including at least a first touch portion, a second touch portion, and a third touch portion, and display a main menu of indicators corresponding to inactive applications, including at least a first indicator, a second indicator, and a third indicator. The main menu occupies the entire display screen and the first indicator corresponds to a first application, the second indicator corresponds to a second application, and the third indicator corresponds to a third application. The controller is further configured to associate the first touch portion with the first indicator, the second touch portion with the second indicator, and the third touch portion with the third indicator and to receive, in the first touch portion, a user input indicating selection of the first indicator. The controller is further configured to display selectable items associated with the first application in an interactive region of the display screen, and at least the second indicator in a non-interactive region of the display screen, and to associate the touchpad with only the interactive region of the display screen.

In another aspect, a method of operating a user interface is provided. The method is implemented by at least one processor in communication with at least one memory device, a touchpad, and a display screen. The method includes displaying a main menu of indicators corresponding to inactive applications, including at least a first indicator, a second indicator, and a third indicator, wherein the main menu occupies the entire display screen, wherein the first indicator corresponds to a first application, the second indicator corresponds to a second application, and the third indicator corresponds to a third application. The method also includes virtually dividing the touchpad into a main menu configuration including at least a first touch portion, a second touch portion, and a third touch portion, and associating the first touch portion with the first indicator, the second touch portion with the second indicator, and the third touch portion with the third indicator. The method further includes receiving, in the first touch portion, a user input indicating selection of the first indicator, displaying selectable items associated with the first application in an interactive region of the display screen, and at least the second indicator in a non-interactive region of the display screen, and associating the touchpad with only the interactive region of the display screen.

DETAILED DESCRIPTION

Figure 1:
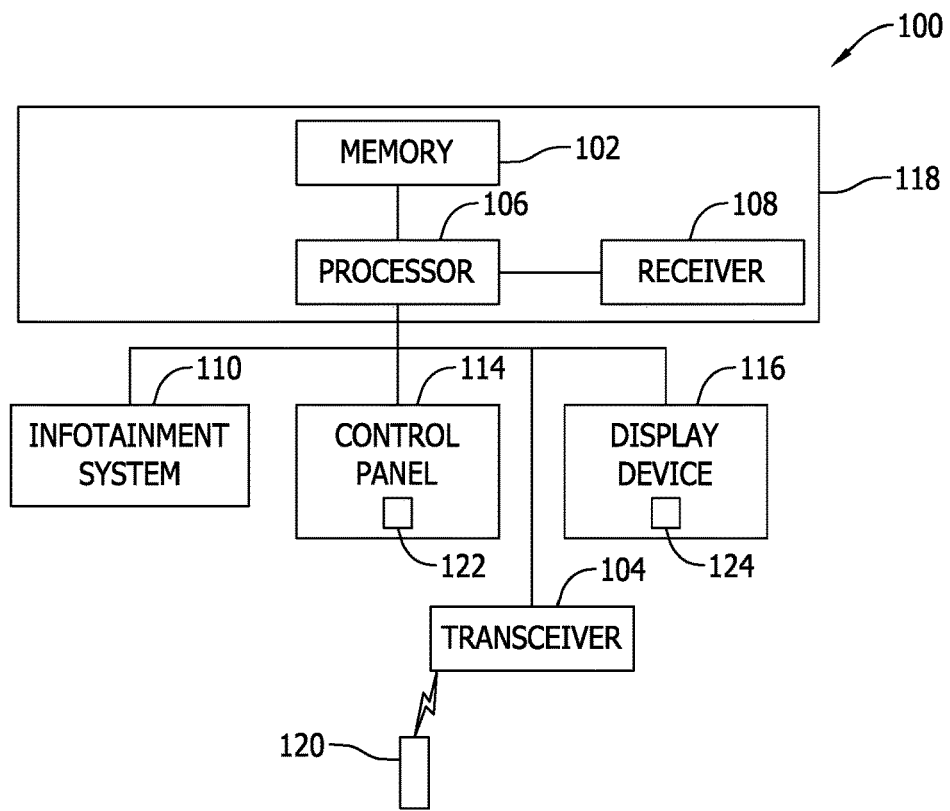
FIG. 1 is a block diagram of an exemplary vehicle control system.

Various embodiments will be better understood when read in conjunction with the appended drawings. To the extent that the figures illustrate the functional blocks of various embodiments, the functional blocks are not necessarily indicative of a division between hardware circuitry. Thus, for example, one or more of the functional blocks (e.g., systems, devices, processors, controllers, and/or memories) may be implemented in a single piece of hardware (e.g., a general purpose signal processor or random access memory, hard disk, or the like) or in multiple pieces of hardware. Similarly, any program may be a stand-alone program, may be incorporated as subroutines in an operating system, may be a function(s) in an installed software package, and/or the like. It should be understood that the various embodiments are not limited to the arrangements and instrumentality shown in the drawings.

Various embodiments of methods and systems for controlling functions of an exemplary vehicle control system, including a vehicle infotainment system, are provided. It should be noted that although the various embodiments are described in connection with the automotive industry, such as for use with an automobile, one or more embodiments may be implemented in different industries and for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a vehicle infotainment system 110, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component within the system 100 (e.g., the vehicle infotainment system 110, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118.

In the exemplary embodiment, vehicular infotainment system 110 may be used to enable the user to access entertainment options and climate controls for the vehicle (not shown). The vehicle entertainment system 110 may include one or more speakers for playing audio content, as well as one or more controls for controlling audio output from one or more of the speakers. The vehicle infotainment system 110, in some embodiments, includes a rear entertainment system, such that passengers in a rear passenger location of a vehicle may be entertained. The rear entertainment system may include a display screen for displaying video or picture content in combination with audio content, and one or more speakers located at one or more rear passenger locations of the vehicle to play the audio content. In some such embodiments, audio content delivered using the rear entertainment system may be different than audio content delivered to a front portion of the vehicle.

The control panel 114 may communicate with the processor 106 via a communication line to transmit data to/from the control panel 114, such as for control of other modules or systems of the vehicle control system 100. In the exemplary embodiment, the control panel 114 includes, and/or is communicatively coupled to, a touchpad 122 for receiving an input from a user for control of the vehicle control system 100. Additionally or alternatively, the control panel 114 may include other input mechanisms, such as mechanical buttons or other controls (e.g., knobs, switches, etc.) associated with the touchpad 122 to receive inputs for controlling the vehicle control system 100. The control panel 114 may have a dedicated control module or unit configured to process the control inputs and/or to process the data to be displayed on the display device and/or the touchpad 122. Alternatively, such control functions may be processed by the processor 106 (e.g., as part of the controller 118). In the exemplary embodiment, the touchpad 122 is configured to detect when a finger touches it. The touchpad senses the user's finger movement and downward pressure. In some embodiments, the control panel 114 interprets the user's movements and pressure to determine the user's inputs. In the exemplary embodiment, the touchpad 122 is remote from any display screen 124.

The display device 116 may communicate with the processor 106 via a communication line to transmit data to/from the display device 116, such as for display of various information to the user of the vehicle. In the exemplary embodiment, the display device 116 includes a display screen 124 for displaying information to the user. In one embodiment, the display device 116 is separate from the control panel 114, such as located at a different location in the vehicle. For example, the display screen 124 may be selectively positioned for convenient viewing by the user, and the touchpad 122 may be selectively positioned within a comfortable distance from a hand of the user. The display screen 124 may display different icons, graphics, and the like. In an alternative embodiment, the display device 116 is the same as, or is coupled to, the control panel 114. For example, the touchpad 122 is combined with the display screen 124, such as via a touchscreen that functions as both an output device and an input device.

Figure 2:
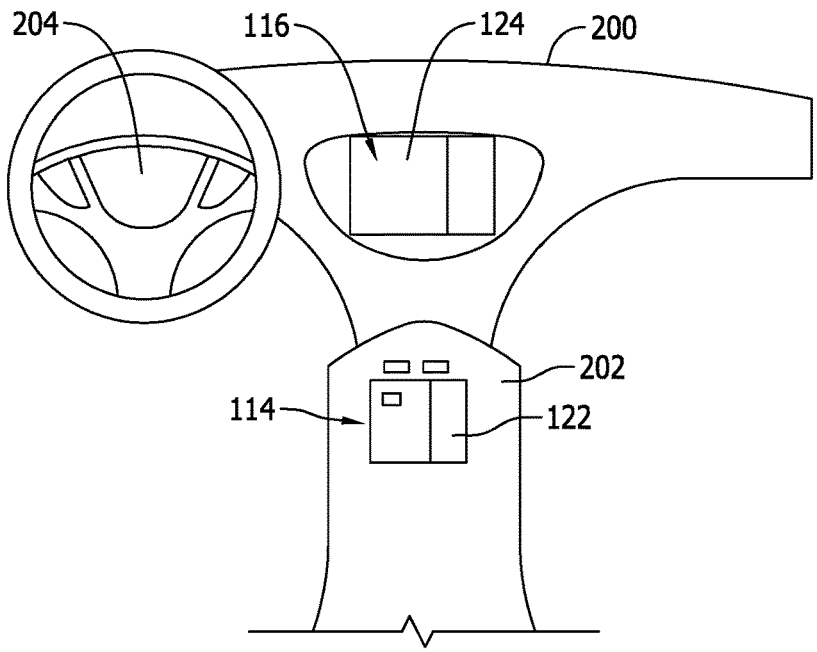
FIG. 2 is a partial schematic view of an exemplary vehicle including the vehicle control system shown in FIG. 1.

FIG. 2 is a partial schematic view of a vehicle including the vehicle control system 100. The vehicle includes a dashboard 200 and a center console 202. In an exemplary embodiment, the display device 116, including the display screen 124, is at a central portion of the dashboard 200 such that a user, or an operator/driver, of a vehicle may easily view the display screen 124 without being distracted from operating the vehicle. The display screen 124 may be located close to the user's eye level to enable the display screen 124 to be peripherally while the user is viewing the roadway ahead. In other embodiments, the display screen 124 may be at other locations within the vehicle. In another embodiment, the display screen 124 extends along the dashboard 200 from behind the steering wheel to the right edge of the center console 202. In some of these embodiments, there is a secondary display screen 204 embedded in the steering wheel. In some embodiments, the secondary display screen 204 is in communication with display device 116.

The touchpad 122 may be located next to the user of the vehicle. The touchpad 122 is positioned to be easily reachable by the user while operating the vehicle. In some embodiments, the touchpad 122 may be located in a center console area 202 next to the user. The touchpad 122 enables the user to select icons displayed on the display screen 124 and associated functions.

The control panel 114 may be communicatively coupled to the controller 118, which controls the display device 116, or may be communicatively coupled directly to the display device 116 for controlling the controller 118. Furthermore, the control panel 114 may be coupled to various sub-systems of the vehicle control system 100, such as the vehicle infotainment system 110, and the like. For example, the control panel 114, the display device 116 and the components of the sub-systems may be communicatively coupled to the processor 106 (shown in FIG. 1).

The display device 116 may have a home menu or main menu (not shown) having display icons corresponding to the various sub-systems, such as the vehicle infotainment system 110. The control panel 114 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

It should be understood that in other exemplary embodiments, the control panel 114 is combined with the display device 116, such that the user interacts with (e.g., touches) the display screen 124 directly to select or otherwise manipulate controls or other content displayed thereon, and that the embodiment of FIG. 2 is illustrative only.

Figure 3:
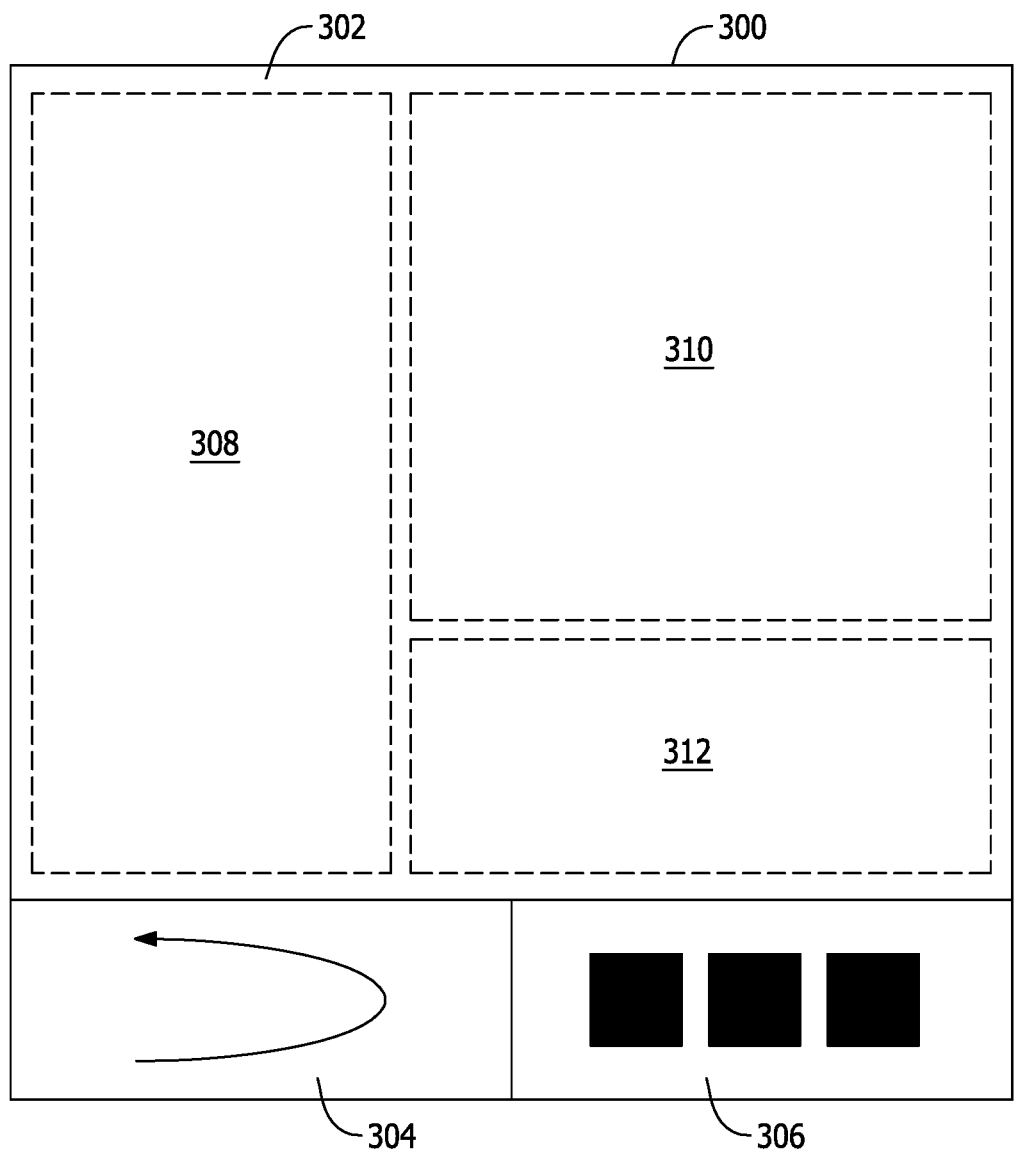
FIG. 3 is an exemplary touchpad that may be used with the vehicle control system shown in FIGS. 1 and 2.

FIG. 3 is an exemplary touchpad 300 including a plurality of regions and buttons. In the exemplary embodiment, touchpad 300 is similar to touchpad 122 (shown in FIG. 1).

In the exemplary embodiment, touchpad 300 includes a touch area 302, a back button 304, and a main menu button 306. In some embodiments, back button 304 and main menu button 306 are physical buttons. In other embodiments, back button 304 and main menu button 306 are virtual buttons and are a part of the touch area 302. In these virtual embodiments, the back button 304 and main menu button 306 may only be available while certain programs or systems are active.

In the exemplary embodiment, touch area 302 is divisible into a first touch portion 308, a second touch portion 310, and a third touch portion 312. This virtual division of touch area 302 is referred to hereinafter as an interactive configuration. In some embodiments, the touchpad 300 includes an integrated display which displays the current configuration of the touch area 302 to provide visual feedback to the user. In the exemplary embodiment, the touch area 302 is only virtually divided into the three areas 308, 310, and 312. In other words, the touch area is not physically divided, but is instead functionally divided into the three touch portions 308, 310, and 312.

In some embodiments, the user may activate back button 304 to return to a previous screen that is being displayed on display screen 124 (shown in FIG. 1). Moreover, in some embodiments, the user may activate main menu button 306 to return to a main menu screen, such as main menu 900 (shown in FIG. 9) associated with the vehicle infotainment system 110 (shown in FIG. 1).

Figure 4:
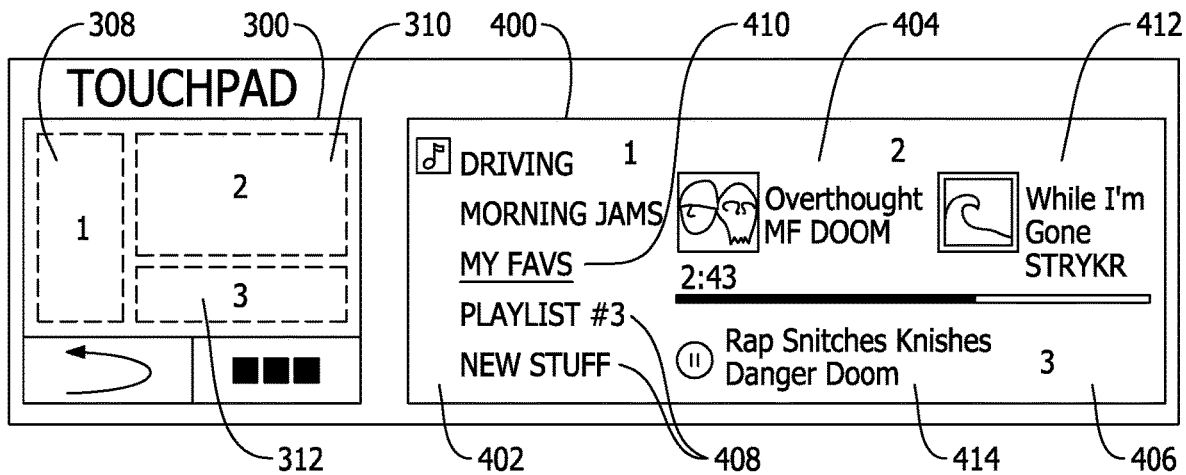
FIG. 4 is a diagram illustrating exemplary region mapping between regions on the touchpad shown in FIG. 3 and regions on a display screen.

FIG. 4 is a diagram illustrating exemplary region mapping between regions 308, 310, and 312 on a touchpad 300 and regions 402, 404, and 406 on a display screen 400. In the exemplary embodiment, display screen 400 is similar to display screen 124 (shown in FIG. 1).

In the exemplary embodiment, display screen 124 is divisible into the three regions 402, 404, and 406 to map to the respective regions 308, 310, and 312 on touchpad 300. Specifically, a first touch portion 308 corresponds to first display portion 402. Second touch portion 310 corresponds to second display portion 404. Third touch portion 312 corresponds to third display portion 406. As such, in the exemplary embodiment, when a user touches the first touch portion 308, then the user is interacting with the first display portion 402. When the user touches the second touch portion 310, then the user is interacting with the second display portion 404. When the user touches third touch portion 312, then the user is interacting with the third display portion 406.

In at least one embodiment, the first display portion 402 includes a vertical list of selectable items 408 including one selected item 410. In some embodiments, the selected item 410 is the selectable item 408 that is in the center of first display portion 402. In these embodiments, as the list of selectable items 408 moves up and down, the selected item 410 changes based on which is in the center of the first display portion 402. In other embodiments, the user may tap on a portion of the first touch portion 308 to select a specific item 408.

The second display portion 404 includes a horizontal list of selectable items 412. The horizontal list in second display portion 404 is associated with the selected item 410. Where when an item 408 is selected in first display portion 402 the corresponding horizontal list of selectable items 412 is displayed in second display portion 404. In some embodiments, the user selects an item by tapping on the portion of second touch portion 310 associated with that item on second display portion 404. In other embodiments, the selected item is the leftmost item 412 being displayed in second display portion 404.

The third display portion 406 display one or more selectable options 414 associated with the selected item 412 in the second display portion 404. The selectable options 414 may be selected by having the user touch the corresponding area on the third touch portion 312. When selected, the selectable options 414 activate one or more functions, such as of the application current executing.

In the exemplary embodiment, when an application, such as a music application opens, the application is displayed on the display screen 400. In some embodiments, the application only displays on a portion of the display screen 400 and other portions of the display screen 400 may continue to display other applications.

For example, the display screen 400 is displaying a music selection program or application. In the first display section 402 a plurality of lists of music 408 are displayed. In the second display section 404 a plurality of songs 412 associated with the selected list 410 are displayed. In the third display section 406 one or more options 414 about the selected song are displayed.

The user may use the first touch portion 308 to scroll up and down through the lists of music 408. This may be done by having the user slide their finger up and down in the first touch portion 308 and having the lists of music 408 move relatively to those movements. The user may also place their finger at the top or bottom of the first touch portion 308 and have the lists of music 408 in the first display portion 402 scroll in that direction. A list may be selected 410 based on it either being at a specific portion of the first display portion 402, such as the center, or having the user tap on a location of the first touch portion 308 associated with the list item 408.

As an individual list of music is selected 410, the songs 412 associated with that list 410 are displayed in the second touch portion 310. The user may use the second touch portion 310 to scroll through the songs 412 displayed in the second display portion 404. This may be done by having the user slide their finger left and right in the second touch portion 310 and having the songs 412 move relatively to those movements. The user may also place their finger at the left or right side of the second touch portion 310 and have the songs 412 in the second display portion 404 scroll in that direction. A song 412 may be selected either by being at a specific portion of the second display portion 404, such as the leftmost location, or having the user tap on a location of the second touch portion 310 associated with the song 412.

As each individual song 412 is selected, additional information about the song 412 is displayed in third display portion 406. In addition, one or more selectable options 414 about the song may be displayed. For example, one selectable option 414 is a play/pause button. Other options 414 may include remove from list, show similar songs, move to another list, and any other selectable option. The user may select the selectable option 414 by touching a location of third touch portion 312 that is relative to where the selectable option 414 is shown in the third display portion 406. In some embodiments, there may only be one selectable option 414 and the user may select it by tapping anywhere on the third touch portion 312.

In some embodiments, the user may user back button 304 (shown in FIG. 3) to close the music application and return to a previously displayed screen. In some embodiments, the user may use the main menu button 306 (shown in FIG. 3) to close the active application and open a main menu, such as a main menu 900 (shown in FIG. 9) associated with the vehicle infotainment system 110 (shown in FIG. 1).

In some embodiments, display screen 400 shows multiple applications. In these embodiments, only one application is the active application. In these embodiments, the touchpad 300 is only mapped to the active application, wherein to access one of the other applications, the user must exit the active application, such as through the main menu button 306 or the back button 304.

Figure 5:
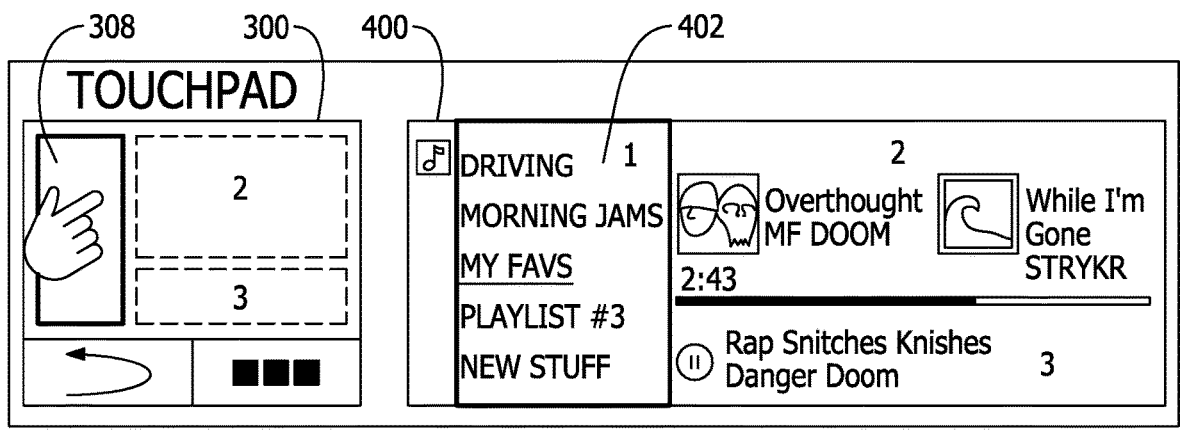
FIG. 5 illustrates a user interacting with a first touch portion of the touchpad shown in FIG. 4 to access the functionality of a first display portion of the display screen shown in FIG. 4.
Figure 6:
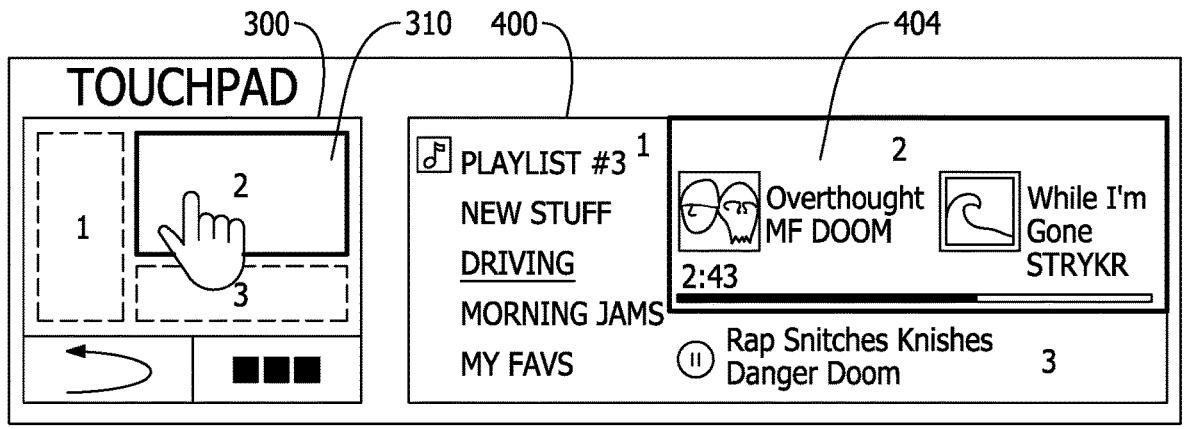
FIG. 6 illustrates a user interacting with a second touch portion of the touchpad shown in FIG. 4 to access the functionality of a second display portion of the display screen shown in FIG. 4.
Figure 7:
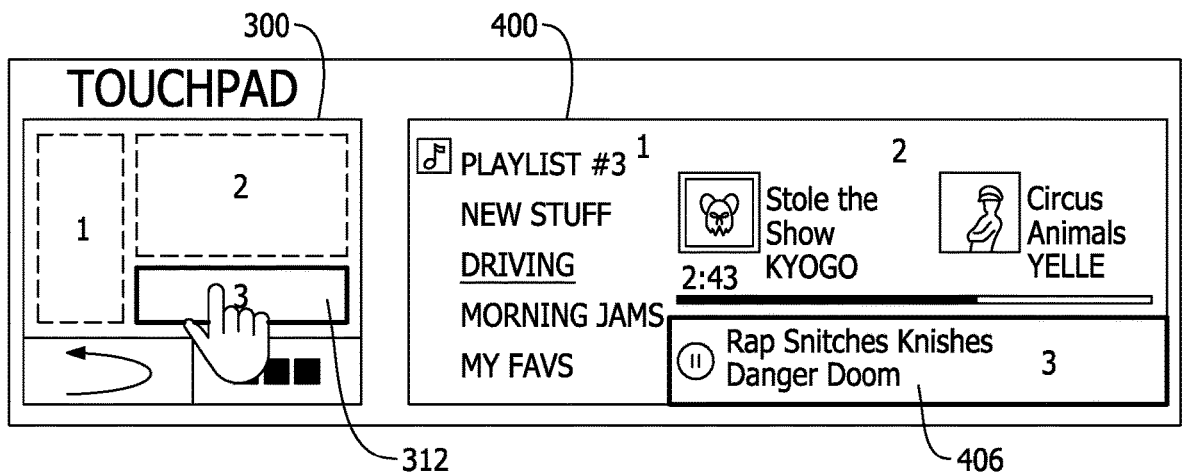
FIG. 7 illustrates a user interacting with a third touch portion of the touchpad shown in FIG. 4 to access the functionality of a third display portion of the display screen shown in FIG. 4.

FIG. 5 illustrates a user interacting with the first touch portion 308 of the touchpad 300 to access the functionality of the first display portion 402 of the display screen 400. FIG. 6 illustrates a user interacting with the second touch portion 310 of the touchpad 300 to access the functionality of the second display portion 404 of the display screen 400. FIG. 7 illustrates a user interacting with the third touch portion 312 of the touchpad 300 to access the functionality of the third display portion 406 of the display screen 400.

Figure 8:
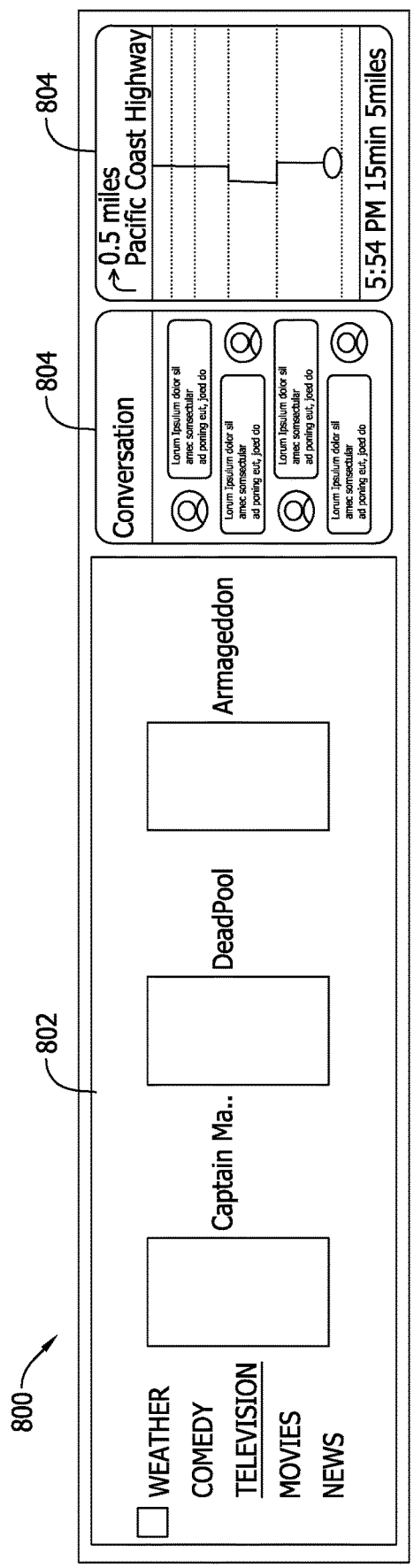
FIG. 8 illustrates an exemplary user interface with interactive and non-interactive applications.

FIG. 8 illustrates an exemplary user interface 800 with an interactive region 802 and at least one non-interactive region 804. In the exemplary embodiment, the user may only interact with one active application at a time. Selectable items and/or information associated with the active application are displayed in interactive region 802. Other applications may be active, but in a mode where the user is unable to interact with them. In these embodiments, the touchpad 300 is mapped only to the interactive region 802 of the display 400, such that the user is unable to interact with the other applications until the interactive application 802 is closed. For example, a user may browse a selection of applications (see FIG. 9) using the touchpad 300. When the user selects an application, that application becomes the active application and associated selectable items and information are displayed in interactive region 802 and the touchpad 300 is virtually divided in the interactive configuration and hard mapped to the interactive region 802 as described above.

Figure 9:
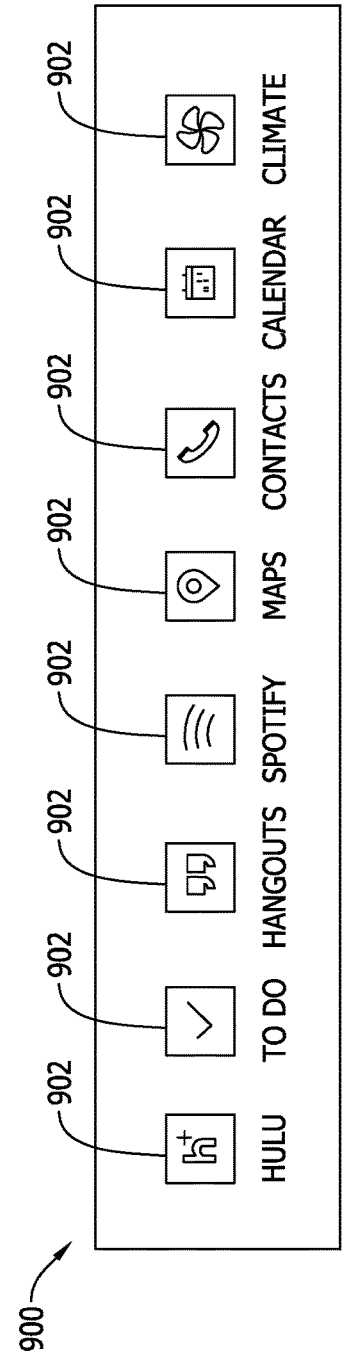
FIG. 9 illustrates an exemplary user interface of a main menu.

FIG. 9 illustrates an exemplary user interface 900 of a main menu. In the exemplary embodiment, the main menu may be reached by pressing the main menu button 306 shown in FIG. 3. The main menu displays a plurality of indicators 902 corresponding to a plurality of applications that a user may select. Each indicator 902 may include words, icons, and/or images describing the corresponding application. Each indicator 902 may also include dynamic information associated with the corresponding application.

Figure 10:
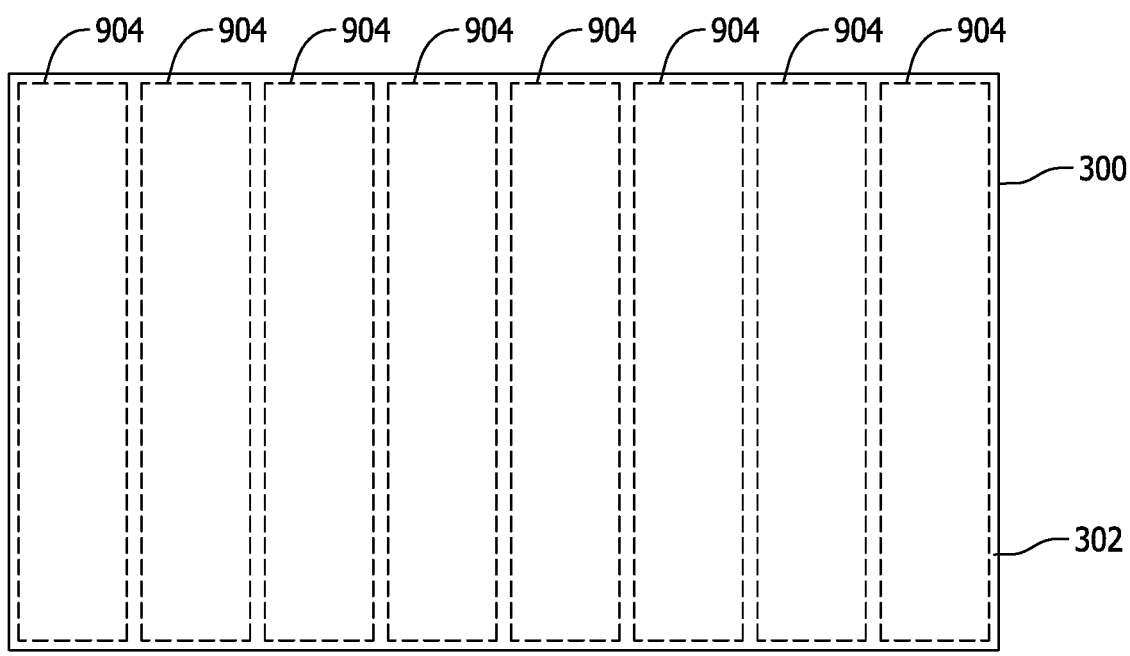
FIG. 10 illustrates a main menu configuration of the touchpad shown in FIG. 3.

FIG. 10 illustrates a main menu configuration of the touchpad 300. In the exemplary embodiment, the user may use the touchpad 300 (also shown in FIG. 3) to select one of indicators 902, and to activate the corresponding application. In some embodiments, the touchpad allows the user to scroll through the indicators 902. In some of these embodiments, the display screen 124 highlights an individual indicator 902 that will be selected if the user taps and/or presses on the touchpad 300. In other embodiments, the area of the touchpad 300 is directly mapped to the entire user interface 900 and the user is able to select an indicator 902 by tapping the touchpad 300 in a location relative to the location of the desired indicator 902 on the user interface 900. For example, the touchpad 300 may be virtually divided into the main menu configuration shown in FIG. 10, touch area 302 is divisible into a plurality of touch portions 904, each corresponding to one of the indicators 902. The touch portions 904 are oriented horizontally in the same manner as indicators 902. Once an indicator is selected and the associated application is activated, selectable items and/or information associated with the activated application is displayed in the interactive region 802 and the touchpad 300 is re-mapped to the active display regions of the display screen, for example, the interactive configuration.

While the above embodiments describe using a music application, the systems described herein may also be used with other application, such as, but not limited to, a phone calling application, a messaging application, a video streaming application, and a navigation application.

Embodiments of the touchpad and display interaction systems described herein facilitate increasing the flexibility and ease of use of interacting with a display screen. The systems described herein provide enhanced communication between the user and the display screen, without requiring the user to lean forward to interact with the information displayed on the display screen.

The methods and system described herein may be implemented using computer programming or engineering techniques including computer software, firmware, hardware, or any combination or subset. Some technical problems with known systems include (a) a need to facilitate communicating information effectively a user, such as a driver; (b) increasing variability and flexibility in the mapping of user inputs to a user interface; and (c) standardizing how the user interacts with applications to reduce the amount of concentration required to activate these systems. Embodiments of the systems and methods described herein address such technical problems. The technical effect of at least some embodiments of the systems and processes described herein is achieved by performing at least one of the following steps: (a) displaying an application on the display screen, wherein the application is divided into a first display region and a second display region; (b) virtually dividing the touchpad into at least a first touchpad region and a second touchpad region; (c) associating the first touchpad region with the first display region and associating the second touchpad region with the second display region; (d) receiving, in the first touchpad region, a user input; and (e) modifying the display of the first display region and the second display region based on the user input. The resulting technical effect is a vehicle infotainment system is provided that allows a user to interact with the system without requiring the user to lean forward to interact with the information displayed on the display screen.

In some embodiments, the technical effect is also achieved by: (f) displaying a plurality of options in the second display region; (g) receiving a first user input to scroll the plurality of options; (h) scrolling the plurality of options based on the first user input; (i) virtually dividing the touchpad into the first touchpad region, the second touchpad region, and a third touchpad region, wherein the third touchpad region is associated with a third display region of the application; (j) receiving a selection of an option of the plurality of options; (k) adjusting the display of the third display region based on the selection; (l) displaying, in the third display region, a selectable option; (m) receiving, in the third touchpad region, a selection of the selectable option; and (n) activating a function associated with the selectable option.

One or more embodiments include a system, which may be implemented as a programmable logic controller (PLC), also referred to as a programmable logic circuit or simply "controller," that controls various functions and operations of the vehicle, such as a vehicle infotainment system and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A vehicle infotainment system comprising:
    a display screen;
    a touchpad remote from the display screen; and
    a controller communicatively coupled to the display screen and to the touchpad, wherein the controller is configured to:
        virtually divide the touchpad into a main menu configuration including at least a first touch portion, a second touch portion, and a third touch portion;
        display a main menu of indicators corresponding to applications, including at least a first indicator, a second indicator, and a third indicator, wherein the main menu occupies the entire display screen, wherein the first indicator corresponds to a first application, the second indicator corresponds to a second application, and the third indicator corresponds to a third application;
        associate the first touch portion with the first indicator, the second touch portion with the second indicator, and the third touch portion with the third indicator;
        receive, in the first touch portion, a user input indicating selection of the first indicator;
        generate and display an interactive region and a non-interactive region on the display screen;
        display, on the display screen, the first application in the interactive region, wherein the interactive region only includes the first application including one or more selectable items and information associated with the first application in at least a first display region of the interactive region, a second display region of the interactive region, and a third display region of the interactive region;
        display a vertical list of options in the first display region, wherein the first display region is a vertical region, wherein the second display region is a horizontal region, wherein the first display region is horizontally adjacent to the second display region, wherein the third display region is a horizontal region, and wherein the third display region is vertically adjacent to the second display region and horizontally adjacent to the first display region;
        display a plurality of options in a horizontal list in the second display region;
        display, in the third display region, a selectable option;
        display, on the display screen, the second indicator and the third indicator in the non-interactive region; and
        reconfigure the touchpad to be associated with only the interactive region of the display screen, wherein portions of the touchpad include at least a first touch portion corresponding to the first display region, a second touch portion corresponding to the second display region, and a third touch portion corresponding to the third display region.

2. The vehicle infotainment system in accordance with claim 1, wherein the controller is further configured to change the first application from an inactive application to an active application.

3. The vehicle infotainment system in accordance with claim 2, wherein the controller is configured to associate the touchpad with only the interactive region of the display screen while the first application is displayed as the active application.

4. The vehicle infotainment system in accordance with claim 1, wherein the controller is further configured to:
    receive a first user input to scroll the vertical list of options; and
    vertically scroll the vertical list of options based on the first user input.

5. The vehicle infotainment system in accordance with claim 4, wherein the controller is further configured to:
    receive a selection of an option of the vertical list of options; and
    adjust the display of the second display region based on the selection.

6. The vehicle infotainment system in accordance with claim 5, wherein the controller is further configured to determine the selection based on a received user input in the first touch portion.

7. The vehicle infotainment system in accordance with claim 5, wherein the controller is further configured to determine the selection based on a location associated with the option in the first display region.

8. The vehicle infotainment system in accordance with claim 1, wherein the controller is further configured to:
    receive a user input to scroll the plurality of options; and
    horizontally scroll the plurality of options based on the user input.

9. The vehicle infotainment system in accordance with claim 8, wherein the controller is further configured to:
receive a selection of an option of the plurality of options; and
adjust the display of the third display region based on the selection.

10. The vehicle infotainment system in accordance with claim 9, wherein the controller is further configured to determine the selection based on a received user input in the second touch portion.

11. The vehicle infotainment system in accordance with claim 9, wherein the controller is further configured to determine the selection based on a location associated with the option in the second display region.

12. The vehicle infotainment system in accordance with claim 1, wherein the controller is further configured to:
receive, in the third touch portion, a selection of the selectable option; and
activate a function associated with the selectable option.

13. The vehicle infotainment system in accordance with claim 1, wherein the controller is further configured to:
receive a request to activate the first application; and
virtually divide the touchpad in response to activating the first application.

14. The vehicle infotainment system in accordance with claim 2, wherein the controller is further configured to:
receive an indication to return to the main menu configuration;
close the active application;
disable the non-interactive region;
virtually divide the touchpad into the main menu configuration; and
display, on the display screen, the main menu of indicators corresponding to inactive applications.

15. A method of operating a user interface, the method implemented by at least one processor in communication with at least one memory device, a touchpad, and a display screen, and wherein the method comprises:
displaying a main menu of indicators corresponding to applications, including at least a first indicator, a second indicator, and a third indicator, wherein the main menu occupies the entire display screen, wherein the first indicator corresponds to a first application, the second indicator corresponds to a second application, and the third indicator corresponds to a third application;
virtually dividing the touchpad into a main menu configuration including at least a first touch portion, a second touch portion, and a third touch portion;
associating the first touch portion with the first indicator, the second touch portion with the second indicator, and the third touch portion with the third indicator;
receiving, in the first touch portion, a user input indicating selection of the first indicator;
generating and displaying an interactive region and a non-interactive region on the display screen;
displaying, on the display screen, the first application in the interactive region, wherein the interactive region only includes the first application including one or more selectable items and information associated with the first application in at least a first display region of the interactive region, a second display region of the interactive region, and a third display region of the interactive region;
displaying a vertical list of options in the first display region, wherein the first display region is a vertical region, wherein the second display region is a horizontal region, wherein the first display region is horizontally adjacent to the second display region, wherein the third display region is a horizontal region, and wherein the third display region is vertically adjacent to the second display region and horizontally adjacent to the first display region;
displaying a plurality of options in a horizontal list in the second display region;
displaying, in the third display region, a selectable option;
displaying, on the display screen, the second indicator and the third indicator in the non-interactive region; and
reconfiguring the touchpad to be associated with only the interactive region of the display screen, wherein portions of the touchpad include at least a first touch portion corresponding to the first display region, a second touch portion corresponding to the second display region, and a third touch portion corresponding to the third display region.

16. The method in accordance with claim 15 further comprising changing the first application from an inactive application to an active application.

17. The method in accordance with claim 16 further comprising associating the touchpad with only the interactive region of the display screen while the first application is displayed as the active application.

18. The method in accordance with claim 15, wherein displaying the interactive region of the display screen and at least the second indicator in the non-interactive region of the display screen comprises displaying the interactive region horizontally adjacent to the non-interactive region.

19. The method in accordance with claim 15, wherein associating the touchpad with only the interactive region of the display screen facilitates controlling the active application while also displaying other available applications.

20. The method in accordance with claim 15 further comprising displaying the main menu upon receiving an input from a main menu button.

* * * * *